US007486632B2

(12) United States Patent
Ookuma

(10) Patent No.: US 7,486,632 B2
(45) Date of Patent: Feb. 3, 2009

(54) RELAY NODE INSTALLATION SELECTION METHOD, RELAY NODE INSTALLATION POINT SELECTION DEVICE, SAME DEVICE-MOUNTED BASE STATION, AND PROGRAM PRODUCT FOR EXECUTING SAME SELECTION METHOD

(75) Inventor: Takahiro Ookuma, Tokyo (JP)

(73) Assignee: NEC Corporation, Tokyo (JP)

( * ) Notice: Subject to any disclaimer, the term of this patent is extended or adjusted under 35 U.S.C. 154(b) by 429 days.

(21) Appl. No.: 11/203,106

(22) Filed: Aug. 15, 2005

(65) Prior Publication Data

US 2006/0056329 A1 Mar. 16, 2006

(30) Foreign Application Priority Data

Sep. 13, 2004 (JP) ............................. 2004-265324

(51) Int. Cl.
*H04B 7/14* (2006.01)
(52) U.S. Cl. ...................................... 370/315; 455/11.1
(58) Field of Classification Search .................... 455/9, 455/10, 11.1, 16; 370/315, 222, 443, 452
See application file for complete search history.

(56) References Cited

U.S. PATENT DOCUMENTS 6,785,510 B2 * 8/2004 Larsen ....................... 455/11.1

7,116,643 B2 * 10/2006 Huang et al. ................ 370/255
2004/0076164 A1 * 4/2004 Vanderveen et al. ........ 370/400

OTHER PUBLICATIONS

Takahiro Ohkuma, Daisuke Kawasaki, Takehiro Hokimoto and Masanobu Arai. Power-efficient multi-hop routing with a message driven stand-by control. The Institute of Electronics, Information and Communication Engineers, Technical Report of IEICE, NS003-232, OC2003-116.

* cited by examiner

*Primary Examiner*—Sam Bhattacharya
(74) *Attorney, Agent, or Firm*—Young & Thompson

(57) ABSTRACT

In a wireless multi-hop network, a node directly connectable in one hop at a relay node installation point candidate is detected. When a node-to-node connectability diagnosis result demonstrates that an isolated node exists, the candidate enabling a connection to the base station and yet the candidate enabling a one-hop connection to the isolated node is selected as a relay node. When an isolated node still remains, the candidate enabling one-hop connections both to the remaining isolated node and to the isolated node that has newly become connectable to the base station is additionally selected as a relay node from among candidates that do not enable a connection to the base station. The route of "the remaining isolated node>additionally added relay node>isolated node that has become connectable to the base station>base station" is established.

21 Claims, 5 Drawing Sheets

RELAY NODE INSTALLATION SELECTION METHOD, RELAY NODE INSTALLATION POINT SELECTION DEVICE, SAME DEVICE-MOUNTED BASE STATION, AND PROGRAM PRODUCT FOR EXECUTING SAME SELECTION METHOD

BACKGROUND OF THE INVENTION

1. Field of the Invention

The present invention relates to a wireless multi-hop network composed of nodes (wireless devices) having a wireless multi-hop function.

2. Description of the Related Art

A wireless sensor network is a network composed of wireless sensor nodes having a sensor, and a base station. In this network, the wireless node collects environmental information (temperature, humidity, material content in the atmosphere, etc.) and transmits the collection result to the base station.

In the wireless sensor network, the wireless multi-hop network technique is used in many cases. The wireless multi-hop network allows the transmission powers of the base station and each node to be reduced and realizes reduction in power consumption by carrying out packet transfer between the base station and the node via one or plural other nodes. This technique is described in, for example, the paper titled "Power-efficient multi-hop routing with a message driven standby control" by Ohkuma et al. in the technical Report of IEICE, NS003-232 (2003-01) (hereinafter, referred to as "Document 1").

In the wireless multi-hop network, all of the nodes having a wireless sensor must be communicatable with the base station. Therefore, in the wireless multi-hop network, a relay node having a reactive (passive) type routing function is installed at a specified installation point.

In order to form the wireless multi-hop network, the base station makes a node-to-node connectability diagnosis. The node-to-node connectability diagnosis is made as follows. First, the base station transmits a control signal to each node. Then, the node that has received the control signal returns a response to the control signal to the base station. In this manner, the base station grasps the connection relationships between the base station and the node and between nodes based on the response from each node.

However, as shown in FIG. 1, there may appear a group of nodes connectable to the base station (hereinafter, referred to as a "base station group") and a group of isolated nodes unconnectable to the base station (hereinafter, referred to as an "isolated node group"). As a matter of course, the isolated node is not communicatable with the base station. Therefore, the relay node is installed in order to connect the isolated node to the base station.

Conventionally, the relay nodes are installed on a basis of trial and error. In other words, first, the relay node is temporarily installed at an appropriate installation point and then the base station makes a node-to-node connectability diagnosis. In this manner, the base station confirms whether or not the isolated node is eliminated.

However, in the conventional method, the isolated node is far from being eliminated in many cases. Therefore, a network designer used to change the relay node installation point many times and repeat the same procedure. Therefore, the determination of the relay node installation point requires many man-hours.

SUMMARY OF THE INVENTION

An exemplary feature of the present invention provides a technique for reducing man-hours required for installing a relay node in a wireless multi-hop network.

One aspect of the present invention carries out a first process and a second process described below.

In the first process, a selection processing section acquires a node-to-node connectability diagnosis result by a base station and a detection result of a node connectable in one hop (that is, "directly connectable") at a relay node installation point candidate.

Here, the latter result can be obtained by temporarily installing a wireless device having a function of detecting a directly connectable node at each relay node installation point candidate and operating it.

When it is judged from the node-to-node connectability diagnosis result that the isolated node is present, the selection processing section performs the first process. In the first process, the selection processing section selects the relay node installation point candidate that satisfies the following two conditions:

(1) the relay node installation point candidate enabling a connection to the base station (that is, the relay node installation point candidate enabling a one-hop connection to the base station or the nodes belonging to the base station group); and (2) the relay node installation point candidate enabling a one-hop connection to the isolated node.

With the first process, a route of "isolated node>relay node>base station" is established for one part of or all of the isolated nodes.

At the time point that the first process has been completed, if there still remains the isolated node, the selection processing section carries out the second process. In the second process, the selection processing section selects the relay node installation point candidate that satisfies the following condition from among relay node installation point candidates that do not enable a connection to the base station:

the relay node installation point candidate enabling a direct connection (that is, enabling a connection to be made in one hop) to both the remaining isolated node and the node that has become connectable to the base station in the first process.

With the second process, a route of "remaining isolated node>relay node>isolated node that has become connectable to the base station in the first process>relay node>base station" is established.

According to the aspect of the present invention, using the node-to-node connectability diagnosis result by the base station and the detection result of the node connectable in one hop at the relay node installation point candidate, thereby to select the relay node installation point candidate for establishing a connection between the base station and the isolated node makes it possible to reduce the number of changes of the relay node installation point candidate.

The description of preferred embodiments will clear other features and aspects of the present invention.

DETAILED DESCRIPTION OF THE PREFERRED EMBODIMENTS

The following is the detailed explanation of embodiments of the present invention with reference to drawings.

Figure 1:
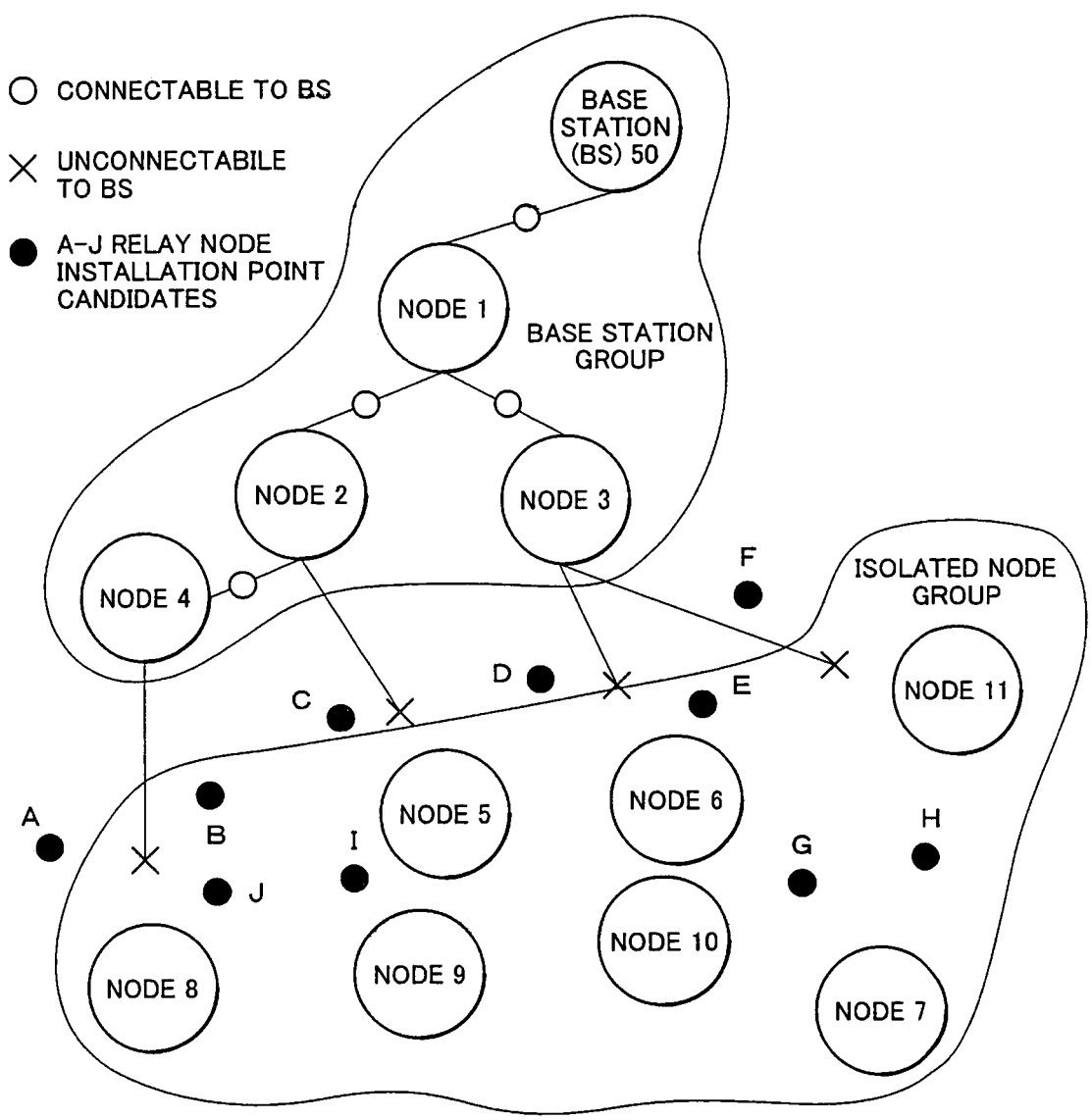
FIG. 1 is a diagram for explaining a wireless multi-hop network.

FIG. 1 is a diagram showing a wireless multi-hop network.

In FIG. 1, nodes 1 to 4 are nodes connectable to a base station 50, forming a base station group. Nodes 5 to 11 are isolated nodes unconnectable to the base station 50, forming an isolated node group. Reference symbols A to J denote relay node installation point candidates. In the network shown in FIG. 1, the relay node installation point is selected from among these relay node installation point candidates A to J.

Figure 2:
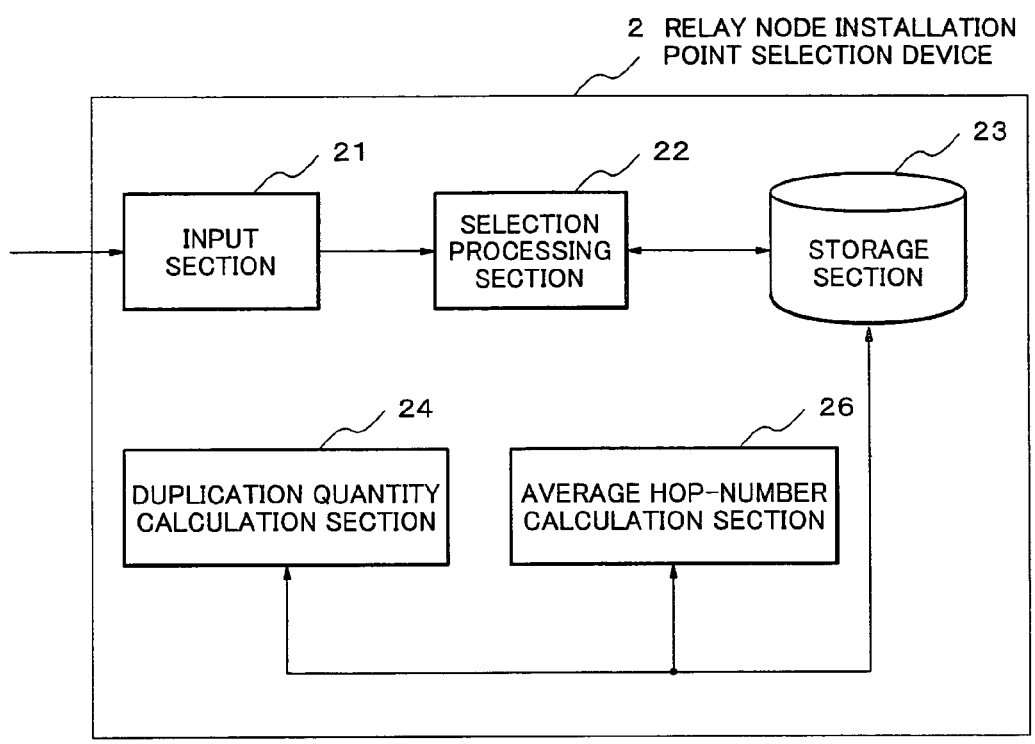
FIG. 2 is a block diagram for explaining a relay node installation point selection device of the present invention.

FIG. 2 is a block diagram for explaining the configuration of a relay node installation point selection device according to the present invention.

A relay node installation point selection device 2 includes an input section 21, a selection processing section 22, a storage section 23, a duplication quantity calculation section 24, and an average hop-number calculation section 26. However, the duplication quantity calculation section 24 and the average hop-number calculation section 26 are optional as will be described later. For example, the embodiment 1 does not require these two calculation devices.

The input section 21 receives a node-to-node connectability diagnosis result by the base station, a detection result of the node connectable in one hop at a relay node installation point candidate, etc., as an input. The former input is supplied from, for example, the base station.

The selection processing section 22 records data, which the input section 21 has received, in the storage section 23 in table form, for example. Then, based on the data stored in the storage section 23 and data obtained by processing the above data by the selection processing section 22 itself, the selection processing section 22 selects the relay node installation point from among relay node installation point candidates.

As will be described later, in embodiment 2 and embodiment 3, based on the data that the selection processing section 22 itself and the duplication quantity calculation section 24 have recorded, the selection processing section 22 selects the relay node installation point from among relay node installation point candidates. In embodiment 4, based on the data that the selection processing section 22 itself and the average hop-number calculation section 26 have recorded, the selection processing section 22 selects the relay node installation point from among relay node installation point candidates.

The storage section 23 stores the data that the input section 21 has received, data obtained by processing the above data by the selection processing section 22, data that the duplication quantity calculation section 24 and the average hop-number calculation section 26 have recorded, etc. in the table form, for example.

The calculation section 24 is necessitated in a relay node installation point selection method in the embodiment 2 and the embodiment 3, which will be described later. Here, the duplication quantity means the number of relay node installation point candidates enabling a connection to the isolated node to be made in one hop. Based on the data stored in the storage section 23 which the input section 21 has received, and data obtained by processing the above data by the selection processing section 22, the duplication quantity calculation section 24 calculates the duplication quantity and records it in the storage section 23. In the embodiment 3, the duplication quantity calculation section 24 calculates the duplication quantity for each of plural sets of relay node installation point candidates.

The average hop-number calculation section 26 is necessitated in a relay node installation point selection method in embodiment 4, which will be described later. The so-called average number of hops is the average of the number of hops between each node and the base station in a set of relay node installation point candidates selected by the selection processing section 22.

Here, the so-called number of hops is equal to the number obtained by adding one (1) to the number of other nodes existing on a route connecting a certain node and the base station. For example, in FIG. 1, the numbers of hops of the nodes 1, 2, 3, and 4 are 1, 2, 2, and 3, respectively. The average hop-number calculation section 26 calculates the average number of hops based on the data stored in the storage section 23 which the input section 21 has received and data obtained by processing the above data by the selection processing section 22, etc. The average hop number calculation section files the calculated value in the storage section 23.

Embodiment 1

Figure 3:
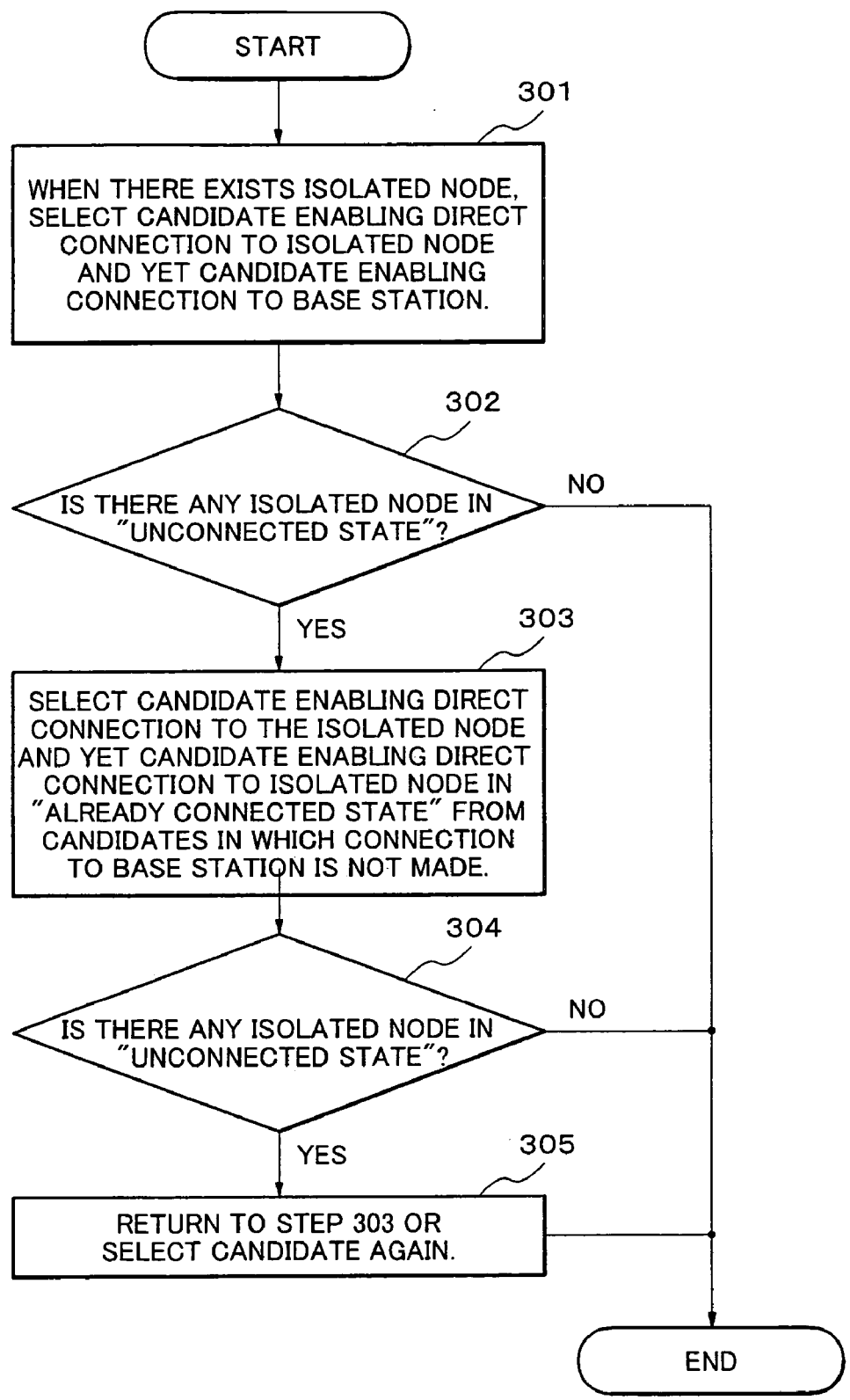
FIG. 3 is a flow chart for explaining a relay node installation point selection procedure in embodiment 1 of the present invention.

Referring to FIG. 3, shown is a flow chart for explaining the procedure of the relay node installation point selection method in the embodiment 1 of the present invention.

In step 301, the input section 21 receives a node-to-node connectability diagnosis result by the base station and a detection result of the nodes to which a connection is enabled in one hop by the relay node installation point candidate. The selection processing section 22 records them in the storage section 23.

Table 1 is a list that the selection processing section 22 has prepared based on the node-to-node connectability diagnosis result by the base station and has filed in the storage section 23. This list describes the number of hops for node IDs.

Here, the so-called number of hops is equal to the number obtained by adding one (1) to the number of the nodes existing on a route connecting the base station and a certain node. For example, in FIG. 1, the numbers of hops of the node 1 to node 4 are 1, 2, 2, and 3, respectively. With other nodes 5 to 11, the connection to the base station has not been established yet, so the numbers of hops thereof are zero.

TABLE 1

| node ID | number of hops |
| --- | --- |
| 1 | 1 |
| 2 | 2 |
| 3 | 2 |
| 4 | 3 |
| 5 | 0 |
| 6 | 0 |
| 7 | 0 |
| 8 | 0 |
| 9 | 0 |
| 10 | 0 |
| 11 | 0 |

Table 2 is a list that the selection processing section 22 has prepared based on the detection result of the nodes connectable to the relay node installation point candidate in one hop and Table 1, and has stored in the storage section 23. The list records IDs of the nodes (nodes belonging to the isolated node group) to which a connection is enabled in one hop by the relay node installation point candidate. In each row of isolated nodes 5 to 11, "1" indicates that a connection is enabled in one hop and "0" indicates that a connection is not enabled in one hop. Further, this list describes node IDs of the nodes belonging to the base station group connectable in one hop for each of relay node installation points A to J. The relay node installation point candidates that do not enable a connection to the nodes belonging to the base station group to be made in one hop are described as "none".

For example, the column of the relay node installation point candidate B in Table 2 indicates that relay node installation point candidate B enables a connection to the isolated node 8 to be made in one hop and enables a connection to the node 4 belonging to the base station group to be made in one hop. Further, the column of the relay node installation point candidate A in Table 2 indicates that the relay node installation point candidate A enables a connection to the isolated node 8 to be made in one hop and does not enable a connection to any node belonging to the base station group to be made in one hop.

TABLE 2

| | | A | B | C | D | E | F | G | H | I | J |
|---|---|---|---|---|---|---|---|---|---|---|---|
| | | \multicolumn{10}{c|}{RESULT LIST} | | | | | | | | |
| isolated node ID | 5 | 0 | 0 | 1 | 1 | 0 | 0 | 0 | 0 | 1 | 0 |
| | 6 | 0 | 0 | 0 | 1 | 1 | 0 | 1 | 0 | 1 | 0 |
| | 7 | 0 | 0 | 0 | 0 | 0 | 0 | 1 | 0 | 0 | 0 |
| | 8 | 1 | 1 | 0 | 0 | 0 | 0 | 0 | 0 | 0 | 1 |
| | 9 | 0 | 0 | 1 | 1 | 0 | 0 | 0 | 0 | 1 | 0 |
| | 10 | 0 | 0 | 0 | 1 | 1 | 0 | 1 | 0 | 1 | 0 |
| | 11 | 0 | 0 | 0 | 0 | 0 | 1 | 0 | 1 | 0 | 0 |
| node ID of base station group | | none | 4 | 2 | 3 | 3 | 3 | none | none | none | none |

In step 301, the selection processing section 22 first judges whether or not the isolated node exists based on Table 1 (the node-to-node connectability diagnosis result by the base station). In the example of Table 1, since the numbers of hops of the nodes 5 to 11 are zero, the selection processing section 22 judges that there exists the isolated node. At this time, if there is no isolated node, it becomes clear that the installation of the relay node installation point is not necessary.

When it has been judged that there exists the isolated node, the selection processing section 22 selects the relay node installation point candidate that satisfies the following conditions based on Table 2 (the detection result of the nodes connectable in one hop at the relay node installation point), in other words:

(1) the relay node installation point candidate enabling a connection to the isolated node to be made in one hope; and yet (2) the relay node installation point candidate enabling a connectable to the base station, that is, the relay node installation point candidate enabling a connection to the node belonging to the base station group to be made in one hop.

With the above-mentioned process, a route is established of "isolated node>relay node>base station".

In the example in FIG. 1, the selection processing section 22 selects, for example, candidate C (for isolated nodes 5 and 9), candidate D (for isolated nodes 6 and 10), candidate B (for isolated node 8), and candidate F (for isolated node 11) from among the relay node installation point candidates A to J.

In this selection, the selection processing section 22 selects the relay node installation point candidate located at the left-most side in each row from among the relay node installation point candidates that satisfy the above-mentioned conditions (however, it does not select the same candidates repeatedly). Other selection criteria will be apparent to those skilled in the art. For example, it may be possible to select all relay node installation point candidates B, C, D, E, and F connectable to the base station.

As a result, the connection between each of the isolated nodes 5, 6, 8, 9, 10, and 11 and the base station is established.

At this time, a new row is provided in Table 2, and in the new row, the box of the isolated node that has become connectable to the base station by the selection of this one set of relay node installation point candidates is marked. Further, another new row is provided in Table 2, and in this new row, the box of the selected relay node installation point candidate is marked. It may be possible to carry out this process by separately preparing tables for recording the selected relay node installation point candidate and the ID of the node that has become connectable owing to this selection and filing them in the storage section 23.

Here, for details of the node-to-node connectability diagnosis by the base station, refer to, for example, Document 1 described above.

The routing described in Document 1 is as follows.

That is, the base station sequentially transmits a detection signal to each node. Only the nodes that have received the detection signal at intensity stronger than predetermined intensity directly return a detection response signal to the base station. Due to this, a connectability between the base station and the node that has returned the detection response signal is established. Next, the base station sequentially transmits the detection signal to each node to which a connection has not been established yet via the node to which a connection has been already established. Only the nodes that have received the detection signal at intensity stronger than predetermined intensity return the detection response signal to the base station via the relay node. Due to this, the node that was directly unconnectable to the base station is connected to the base station via the node that was directly connectable to the base station. By repeating the above-mentioned process, the wireless multi-hop network is formed, and together therewith, the connection relationship between the base station and each node becomes clear.

The detection of the node connectable in one hop at the relay node installation point candidate is carried out, for example, as follows. First, a wireless device (may be one for the base station) having a function of detecting the node connectable in one hop is installed at each relay node installation point candidate. Then, when the device is caused to operate, it tries to communicate with all the nodes, thereby making it possible to find the nodes communicatable in one hop at the relay node installation point candidate. It is possible to obtain the detection result also by limiting the AODV routing technique regulated by IETF RFC3561 or the like to the process up to one hop to use it.

The explanation of the step 301 ends as above.

In step 302, the selection processing section 22 judges whether or not there still remains the isolated node in an "unconnected state" with the base station based on the execution result of the step 301. Here the so-called "unconnected state" means that any connection to the base station has not been established yet. In the example shown in Table 2, since the node 7 is in the "unconnected state" with the base station, the process of the selection processing section 22 proceeds to step 303. If there remains no isolated node in the "unconnected state" as a result of the process in the step 301, the process of the selection processing section 22 ends.

In the step 303, the selection processing section 22 selects the relay node installation point candidate that satisfies the following conditions from among relay node installation point candidates in which a connection to the node belonging to the base station group has not been made based on Table 2 (the detection result of the node connectable in one hop at the relay node installation point candidate):

(1) the relay node installation point candidate enabling a one-hop connection to the node that has become connectable to the base station (in the process in the step 301); and yet (2) the relay node installation point candidate enabling a one-hop connection to the isolated node to be made in one hop.

Speaking the example in Table 2, the isolated node 7 that has been left is connectable in one hop to the relay node installation point G, though unconnectable in one hop to the node in the base station group. However, the relay node installation point G enables a connection to the node 10 of which a connection to the base station has been established in the step 301. Therefore, since the relay node installation point candidate satisfies these conditions, the relay node installation point G is selected in the step 303. Due to this, the node 7 that has been left as an isolated node in the process in the step 301 also now becomes connectable to the base station. In other words, a connection through "node 7>relay node G>node 6>relay node D> . . . >base station" is established.

In step 304, the selection processing section 22 judges whether or not there still remains the isolated node in the "unconnected state" based on the detection result of the node connectable in one hop at the relay node installation point candidate. If there remains the isolated node in the "unconnected state", the process of the selection processing section 22 proceeds to step 305, and otherwise, the process of the selection processing section 22 ends.

In the step 305, the selection processing section 22 repeats the process in the step 303, or returns to the step 303 and starts from scratch by reselecting the relay node installation point candidate again. When the number of repetitions reaches a predetermined number, it may be possible to select the relay node installation point candidate again in the step 303.

In the embodiment 1 described above, the step 303 is executed only when there remains the isolated node at the time when the process in step 302 ends. Therefore, when it is possible to prepare a sufficient number of the relay node installation point candidates, all the nodes belonging to the isolated node group are made connectable to the base station without carrying out the processes in the step 303 and the subsequent steps. Further, even if the process is ended in the step 303, many isolated nodes have become connectable to the base station, so man-hours also required for changing the relay node installation point candidate can be small. Therefore, in such a case, the processes in the step 302 and the subsequent steps are not necessarily indispensable.

Embodiment 2

Figure 4A:
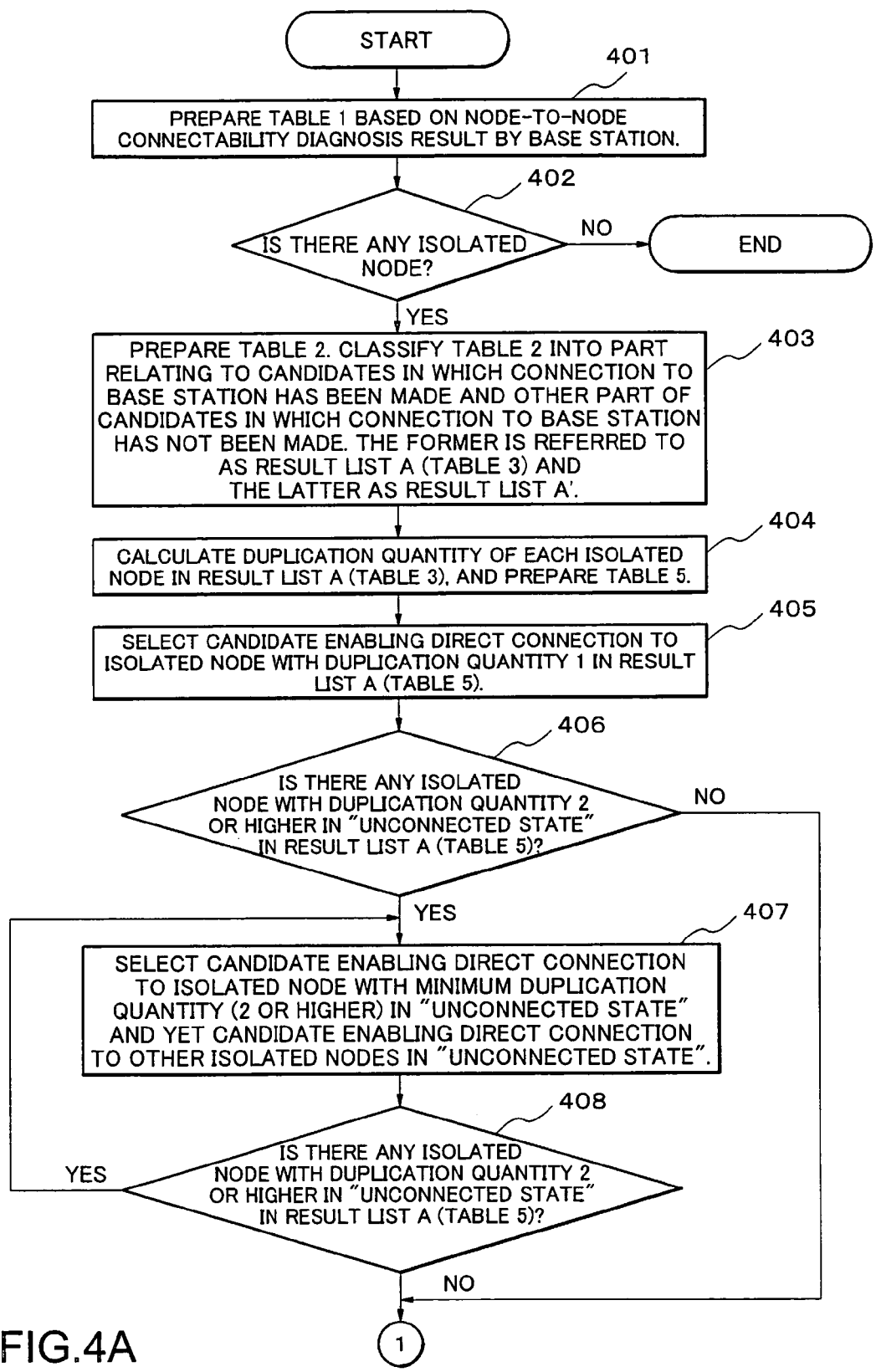
FIG. 4A and FIG. 4B are flow charts for explaining a relay node installation point selection procedure in embodiment 2 of the present invention.
Figure 4B:
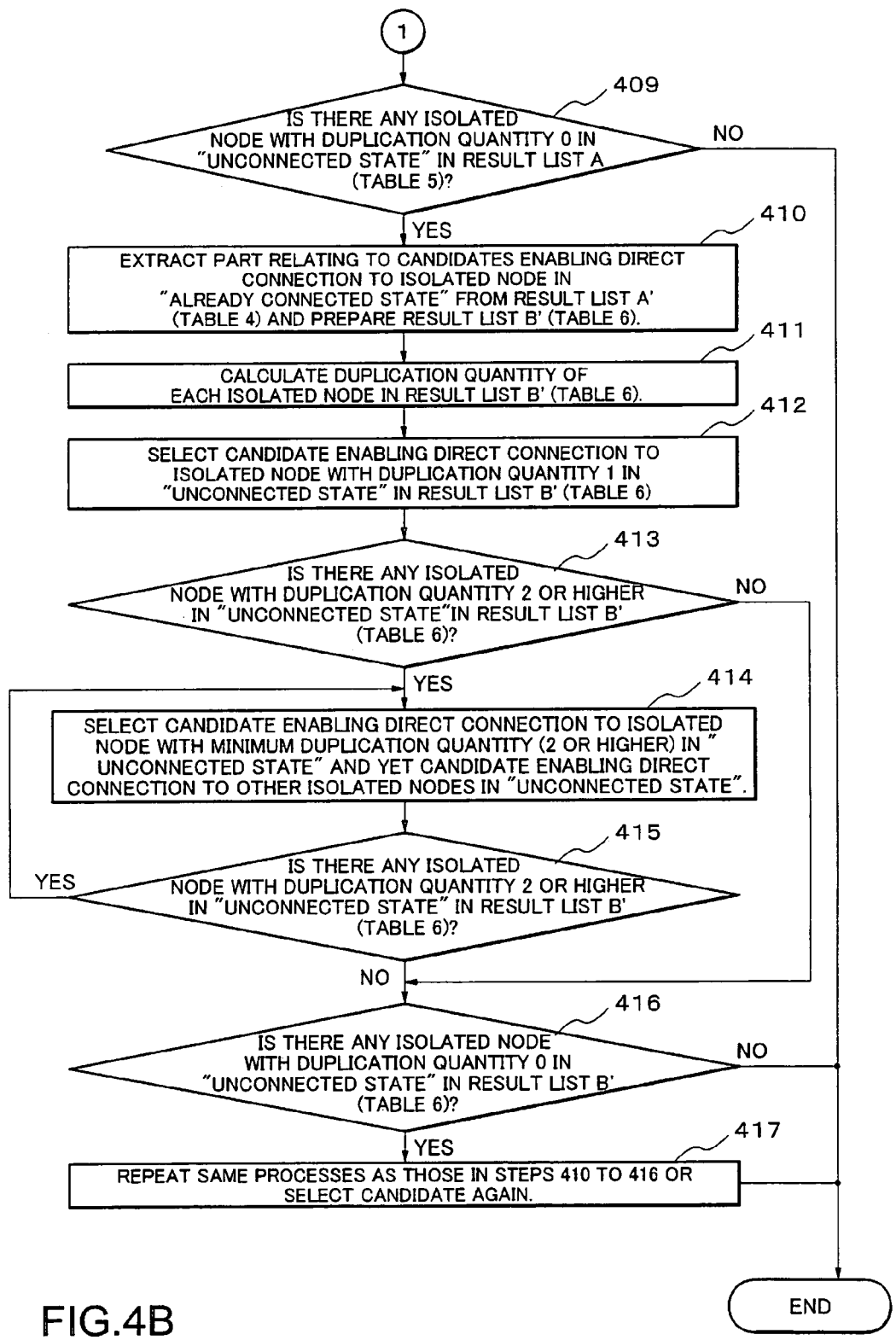

FIG. 4A and FIG. 4B are flow charts showing a relay node installation point selection procedure in the embodiment 2 according to the present invention.

This embodiment is for the relay node installation point selection procedure that minimizes the number of the relay nodes. Due to this embodiment, it is possible to reduce the number of the nodes in the wireless multi-hop network and to effectively utilize the resource as well as to make a contribution to the power saving of the entire network.

In this embodiment, the duplication quantity calculation section 24 calculates the duplication quantity (that is, the number of the relay node installation point candidates to which each isolated node is connectable in one hop). Then, the selection processing section selects the relay node installation point candidate while taking the duplication quantity into account. Due to this, this embodiment requires the duplication quantity calculation section 24. The duplication quantity calculation section 24 calculates the duplication quantity based on the data stored in the storage section 23, which the input section 21 has received, data obtained by processing the above data by the selection processing section 22, etc., and records it in the storage section 23

In step 401, similarly to the embodiment 1, the input section 21 receives the "node-to-node connectability diagnosis result by the base station". Then, the selection processing section 22 prepares a table showing the relationship between the node and the number of hops based on this. In the example in FIG. 1, the selection processing section 22 prepares Table 1 and records it in the storage section 23. As for Table 1, explanation is the same as that in the embodiment 1.

In step 402, the selection processing section 22 judges whether or not there exists the isolated node based on Table 1 (the table showing a correspondence between the node and the number of hops). In Table 1, if there exists the node the hop number of which is zero, the selection processing section 22 judges that there exists the isolated node. In Table 1, the numbers of hops of the node 5 to node 11 are zero, the selection processing section 22 judges that there exists the isolated node. When the selection processing section 22 judges that there exists the isolated node, the process of the selection processing section 22 proceeds to step 403 and otherwise, the selection processing section 22 ends the process.

In the step 403, the input section 21 receives the detection result of the node connectable in one hop at each relay node installation point candidate. The selection processing section 22 prepares a table showing a one-hop-connection relationship between the isolated node and the relay node installation point candidate and files it in the storage section 23. Table 2 described above is a table prepared for the network in FIG. 1.

Table 2 is a table showing the one-hop-connection relationship between the isolated node and the relay node installation point candidate in the wireless multi-hop network in FIG. 1. As for Table 2 also, explanation is the same as that in the embodiment 1, so the duplicated explanation is omitted here.

Further, the selection processing section 22 classifies Table 2 into two tables. One is a table for the relay node installation point candidates in which a connection to the base station has been made. The other is a table for the relay node installation point candidates in which a connection to the base station has not been made. The selection processing section 22 files the former as result list A (Table 3) and the latter as result list A' (Table 4) in the storage section 23.

Table 3 and Table 4 are the result list A, and the result list A' classified from Table 2, respectively. As described above, the box of the "node ID of the base station group" indicates the ID of the node belonging to the base station group to which a connection is enabled in one hop by the relay node installation point candidate. Therefore, the relay node installation point candidate having the number described in the box of the "node ID of the base station group" enables a connection to the base station. The relay node installation point candidate having "none" described in the box of the "node ID of the base station group" does not enable a connection to the base station.

In step 404, Table 2 is classified into Table 3 and Table 4 based on the node ID of the base station group. With table 2, the columns of the relay node installation point candidates B, C, D, E, and F are classified into Table 3. The columns of the relay node installation point candidates A, G, H, I, and J in Table 2 are classified into Table 4.

TABLE 3

|  |  | RESULT LIST A | | | | |
|---|---|---|---|---|---|---|
|  |  | B | C | D | E | F |
| isolated node ID | 5 | 0 | 1 | 1 | 0 | 0 |
|  | 6 | 0 | 0 | 1 | 1 | 0 |
|  | 7 | 0 | 0 | 0 | 0 | 0 |
|  | 8 | 1 | 0 | 0 | 0 | 0 |
|  | 9 | 0 | 1 | 1 | 0 | 0 |
|  | 10 | 0 | 0 | 1 | 1 | 0 |
|  | 11 | 0 | 0 | 0 | 0 | 1 |
| node ID of base station group |  | 4 | 2 | 3 | 3 | 3 |

TABLE 4

|  |  | RESULT LIST A' | | | | |
|---|---|---|---|---|---|---|
|  |  | A | G | H | I | J |
| isolated node ID | 5 | 0 | 0 | 0 | 1 | 0 |
|  | 6 | 0 | 1 | 0 | 1 | 0 |
|  | 7 | 0 | 1 | 0 | 0 | 0 |
|  | 8 | 1 | 0 | 0 | 0 | 1 |
|  | 9 | 0 | 0 | 0 | 1 | 0 |
|  | 10 | 0 | 1 | 0 | 1 | 0 |
|  | 11 | 0 | 0 | 1 | 0 | 0 |
| node ID of base station group |  | none | none | none | none | none |

In this embodiment, the following processes (1) and (2) are carried out in order. The classification into the result list A, and the result list A' is carried out for convenience of carrying out the two processes.

(1) A process for establishing a route of: isolated node>relay node>base station (2) A process for establishing a route of: isolated node in an "unconnected state">relay node>isolated node in an "already connected state">base station Here, the "unconnected state" means a state in which any connection with the base station has not been established even with the process (1). The "already connected state" means a state in which a connection with the base station has been established by installing the relay node.

Subsequent step 404 to step 409 correspond to the process (1) and step 410 to step 416 correspond to the process (2).

In the step 404, the duplication quantity calculation section 24 calculates the duplication quantity of each isolated node based on the result list A (Table 3) stored in storage section 23. Then, the duplication quantity calculation section 24 prepares Table 5, which is the result list A to which the duplication quantity is written additionally, and files it in the storage section 23. The duplication quantity can be obtained by summing up the values in the row.

TABLE 5

|  |  | RESULT LIST A | | | | | duplication quantity |
|---|---|---|---|---|---|---|---|
|  |  | B | C | D | E | F |  |
| isolated node ID | 5 | 0 | 1 | 1 | 0 | 0 | 2 |
|  | 6 | 0 | 0 | 1 | 1 | 0 | 2 |
|  | 7 | 0 | 0 | 0 | 0 | 0 | 0 |
|  | 8 | 1 | 0 | 0 | 0 | 0 | 1 |
|  | 9 | 0 | 1 | 1 | 0 | 0 | 2 |
|  | 10 | 0 | 0 | 1 | 1 | 0 | 2 |
|  | 11 | 0 | 0 | 0 | 0 | 1 | 1 |
| node ID of base station group |  | 4 | 2 | 3 | 3 | 3 |  |

Next, in the step 405, the selection processing section 22 selects the relay node installation point candidate enabling a one-hop connection to the isolated node with duplication quantity 1 in the result list A (Table 5) including the duplication quantity stored in the storage section 23.

In Table 5, the isolated nodes with duplication quantity 1 are the node 8 and the node 11. Then, the relay node installation point candidates enabling one-hop connections to the node 8 and the node 11 are B and F, respectively. Therefore, the selection processing section 22 selects B and F as a relay node installation point. Then, by selecting B and F as a relay node installation point, the following two connection routes are established:

isolated node 8>relay node B>(node 4>node 2>node 1)>base station 50; and isolated node 11>relay node F>(node 3>node 1)>base station 50.

At this time, if there exists another isolated node connectable to the relay node B and the relay node F in one hop, a connection route with the base station is established for this isolated node as well simultaneously. In Table 5, there happens to exist no such isolated node. Therefore, in this stage, a connection route with the base station is established for the isolated node 8 and the isolated node 11.

In this embodiment, the reason for establishing a route starting from the isolated node with duplication quantity 1 is to reduce the number of the relay nodes. By using the relay node selected through a route established with the isolated node with a low duplication quantity also in a route with the isolated node with a high duplication quantity, it is possible to reduce the number of the relay nodes.

In the step 406, the selection processing section 22 judges whether or not there exists the isolated node in the "unconnected state" with duplication quantity 2 or higher based on the result list A (Table 5) including the duplication quantity. In table 5, since the node 5, the node 6, the node 9, and the node 10 are the isolated nodes with duplication quantity 2 in the "unconnected state", the selection processing section 22 judges that there exists the isolated node in the "unconnected state" with duplication quantity 2 or higher. When it has been judged that there exists the isolated node in the "unconnected state" with duplication quantity 2 or higher, the process of the selection processing section 22 proceeds to the step 407. When it has been judged that there exist no isolated node with duplication quantity 2 or higher in the "unconnected state", the selection processing section 22 proceeds to the step 409 of judging whether or not to start the establishment of a route of isolated node "in an unconnected state">relay node>isolated node "in an already connected state">base station.

In the step 407, the selection processing section 22 selects the relay node installation point candidate that satisfies the following conditions:

(a) the relay node installation point candidate enabling a connection to the isolated node with the minimum duplication quantity (2 or higher) in the "unconnected state" to be made in one hop; and yet (b) the relay node installation point candidate enabling a one-hop connection to the isolated nodes in the "unconnected state" more numerously.

In Table 5, the isolated nodes with minimum duplication quantity 2 in the "unconnected state" are the node 5, the node 6, the node 9, and the node 10.

Then, the relay node installation point candidates enabling a one-hop connection to the node 5 are C and D. C enables a one-hop connection to the node 9, which is the isolated node in the "unconnected state". On the other hand, D enables a one-hop connection to the node 6, the node 9, and the node 10, which are the isolated nodes in the "unconnected state". Therefore, D enabling a one-hop connection to the isolated nodes in the "unconnected state" more numerously is selected for the node 5. Similarly, D is selected for the node 6, the node 9, and the node 10 as well. As a result, the following four connection routes are newly established:

Isolated node 5>relay node D>(node 3>node 1)>base station 50

Isolated node 6>relay node D>(node 3>node 1)>base station 50

Isolated node 9>relay node D>(node 3>node 1)>base station 50

Isolated node 10>relay node D>(node 3>node 1)>base station 50

As described above, by preferentially selecting the relay node installation point candidate enabling a connection to the isolated nodes in the "unconnected state" to be made in one hop more numerously, it is possible to reduce the number of relay nodes.

Next, in the step 408, the selection processing section 22 judges whether or not there remains the isolated node with duplication quantity 2 or higher in the "unconnected state" based on Table 5, which is the result list A including the duplication quantity. In the case of Table 5, since there remains no isolated node with duplication quantity 3 or higher (the isolated node with duplication quantity 2 in the "unconnected state" no longer exists), the selection processing section 22 judges that there exists no isolated node with duplication quantity 2 or higher in the "unconnected state".

When the judgment result in the step 408 is "NO", the process of the selection processing section 22 proceeds to the step 409. Otherwise, the process of the selection processing section 22 returns to the step 407.

In the step 409, the selection processing section 22 judges whether or not there exists the isolated node with duplication quantity 0 in the "unconnected state" based on Table 5, which is the result list A including the duplication quantity. In Table 5, the node 7 is an isolated node with duplication quantity 0 in the "unconnected state", so the selection processing section 22 judges that there exists the isolated node with duplication quantity 0 in the "unconnected state". When the selection processing section 22 has judged that there exists the isolated node in the "unconnected state" with duplication quantity 0

(YES), the process of the selection processing section 22 proceeds to the step 410. Otherwise, the selection processing section 22 ends the process.

The isolated node in the "unconnected state" with duplication quantity 0 is directly unconnectable to the relay node installation point candidate at which a connection to the base station has been made. As a result, it is not possible to make a connection to the base station.

In this embodiment, it is detected whether or not the relay node installation point candidate (X) to which the isolated node (x) in the "unconnected state" is connectable in one hop enables a connection to the isolated node (y) that has already become connectable to the base station. If a connection between X and y is enabled, the selection processing section 22 establishes a connection between the isolated node (x) in the "unconnected state" and the base station using a route via the "already connected" isolated node.

In other words, the selection processing section 22 establishes a connection as follows:

isolated node (x) in an "unconnected state"

>relay node (relay node installed at the relay node installation point (X) in which a connection to the base station has not been made)

>isolated node (y) in an "already connected state"

>base station.

The establishment of the connection is carried out, by selecting the relay node installation point candidate (X) in which a connection to the base station has not been made as a relay node installation point.

Returning to FIG. 4B, in the step 410, the selection processing section 22 classifies the result list A' (Table 4: a table showing a one-hop-connection relationship between the isolated node and the relay node installation point candidate in which a connection to the base station has not been made) into two parts. One part relates to the relay node installation point candidates enabling a one-hop connection to the isolated node in the "already connected state". The other part relates to relay node installation point candidates that does not enables a one-hop connection to the isolated node in the "already connected state". The selection processing section 22 files the former as the result list B' (Table 6) in the storage section 23.

In Table 4, the isolated nodes in the "already connected state" are the node 5, the node 6, the node 8, the node 9, the node 10, and the node 11. Therefore, the selection processing section 22 extracts the columns of A (node 8), G (node 6, node 10), H (node 11), I (node 5, node 6, node 9, node 10), and J (node 8) as a relay node installation point candidate enabling a connection to the isolated node in the "already connected state" to be made in one hop and prepares Table 6.

TABLE 6

|  |  | RESULT LIST B' |  |  |  |  | duplication quantity |
|---|---|---|---|---|---|---|---|
|  |  | A | G | H | I | J |  |
| isolated node ID | 5 | 0 | 0 | 0 | 1 | 0 | 1 |
|  | 6 | 0 | 1 | 0 | 1 | 0 | 2 |
|  | 7 | 0 | 1 | 0 | 0 | 0 | 1 |
|  | 8 | 1 | 0 | 0 | 0 | 1 | 2 |
|  | 9 | 0 | 0 | 0 | 1 | 0 | 1 |
|  | 10 | 0 | 1 | 0 | 1 | 0 | 2 |
|  | 11 | 0 | 0 | 1 | 0 | 0 | 1 |
| node ID of base station group |  | none | none | none | none | none |  |

In the step 411, the duplication quantity calculation section 24 calculates the duplication quantity of each isolated node based on Table 6, which is the result list B'. In Table 6, the calculation results of the duplication quantity also have been already described.

In the step 412, the selection processing section 22 selects the relay node installation point candidate enabling a one-hop connection to the isolated node with duplication quantity 1 in the "unconnected state" based on the result list B' (Table 6). In Table 6, the isolated node with duplication quantity 1 in the "unconnected state " is the node 7 only. Further, the relay node installation point candidate enabling a one-hop connection to the node 7 is only G. Therefore, the selection processing section 22 selects the relay node installation point candidate G.

As a result, the following route is newly established:
isolated node 7>relay node G>isolated node 6 in an "already connected state">(relay node D>node 3>node 1)>base station 50; or
isolated node 7>relay node G>isolated node 10 in an "already connected state">(relay node D>node 3>node 1)>base station 50.

In the step 413, the selection processing section 22 judges whether or not there exists the isolated node with duplication quantity 2 or higher in the "unconnected state" based on the result list B' (Table 6). In Table 6, there exists no isolated node with duplication quantity 2 or higher in the "unconnected state" (all of the isolated nodes are in the "already connected state"). When the selection processing section 22 has judged that there exists no isolated node with duplication quantity 2 or higher in the "unconnected state" (branching to NO in the step 413), the process of the selection processing section 22 proceeds to the step 416. Otherwise (branching to YES in the step 413), the process of the selection processing section 22 proceeds to the step 414.

In the step 414, the selection processing section 22 selects the relay node installation point candidate enabling a one-hop connection to the "unconnected" isolated node with the minimum duplication quantity (2 or higher) and yet the relay node installation point candidate enabling a one-hop connection to the "unconnected" isolated nodes more numerously based on the result list B' (Table 6).

In the step 415, the selection processing section 22 judges whether or not there exists the "unconnected" isolated node with duplication quantity 2 or higher based on the result list B' 'Table 6). When the selection processing section 22 has judged that there exists no "unconnected" isolated node with duplication quantity 2 or higher (branching to NO), the process of the selection processing section 22 proceeds to the step 416. Otherwise, the process of the selection processing section 22 returns to the step 414.

In the step 416, the selection processing section 22 judges whether or not there exists the isolated node with duplication quantity 0 in the "unconnected state" based on the result list B' (Table 6). In Table 6, there is no isolated node with duplication quantity 0 in the "unconnected state". When the selection processing section 22 has judged that there exists no isolated node with duplication quantity 0 in the "unconnected state" (NO), the process of the selection processing section 22 ends. Otherwise, the process of the selection processing section 22 proceeds to the step 417.

In the Step 417, the process similar to that of the steps 410 to 416 is repeated, or the relay node installation point candidate is selected again to carry out the process from scratch. If the repetition of the processes in the steps 410 to 416 for a predetermined times does not eliminate the isolated node in the "unconnected state", it may be possible to select the relay node installation point candidate set again and to carry out the processes in the steps 410 to 416.

Installation of the relay node at the relay node installation point obtained as above causes the isolated node to be connected to the base station. Table 7 is a table showing a relationship between the node and the number of hops when selecting the relay node installation point with the processes in the step 401 to step 417 and installing the relay node at the point for the wireless multi-hop network shown in FIG. 1.

TABLE 7

| node ID | number of hops |
|---------|----------------|
| 1       | 1              |
| 2       | 2              |
| 3       | 2              |
| 4       | 3              |
| 5       | 4              |
| 6       | 4              |
| 7       | 6              |
| 8       | 5              |
| 9       | 4              |
| 10      | 4              |
| 11      | 4              |
| B       | 4              |
| D       | 3              |
| F       | 3              |
| G       | 5              |

The established routes are summarized as follows.
node 1>base station 50
node 2>node 1>base station 50
node 3>node 1>base station 50
node 4>node 2>node 1>base station 50
node 5>relay node D>node 3>node 1>base station 50
node 6>relay node D>node 3>node 1>base station 50
node 7>relay node G>node 6>relay node D>node 3>node 1>base station 50 (or, node 7>relay node G>node 10>relay node D>node 3>node 1>base station 50)
node 8>relay node B>node 4>node 2>node 1>base station 50
node 9>relay node D>node 3>node 1>base station 50
node 10>relay node D>node 3>node 1>base station 50
node 11>relay node F>node 3>node 1>base station 50
relay node B>node 4>node 2>node 1>base station 50
relay node D>node 3>node 1>base station 50
relay node F>node 3>node 1>base station 50
relay node G>node 10>relay node D>node 3>node 1>base station 50

Embodiment 3

The following is the explanation of a relay node installation point selection method in embodiment 3 of the present invention.

This embodiment is for a relay node installation point selection method for selecting a set of relay node installation point candidates for increasing the redundancy of the route. According to this embodiment, even if, for example, communication trouble occurs in one route, it becomes possible to switch the route to another route.

In this embodiment, the selection processing section calculates the duplication quantity using the duplication quantity calculation section for each of plural sets of relay node installation point candidates. Based on the result, the selection processing section selects one relay node installation point candidate set from among the plural sets. A concrete explanation is as follows.

For example, let's assume that Table 8 and Table 9 are obtained in the embodiment 1 or the embodiment 2, which are a one-hop-connection relationship between the isolated node and the relay node installation point candidate in plural sets of relay node installation point candidates. By the way, Table 8 and Table 9 relate to a wireless multi-hop network different from that to which Table 1 to Table 7 relate.

TABLE 8

|  |  | candidate set I | | | | duplication |
|---|---|---|---|---|---|---|
|  |  | A | B | C | D | quantity |
| isolated node ID | 5 | 1 | 0 | 1 | 1 | 3 |
|  | 6 | 0 | 0 | 1 | 0 | 1 |
|  | 7 | 1 | 0 | 0 | 0 | 1 |
|  | 8 | 1 | 1 | 0 | 0 | 2 |
|  | 9 | 0 | 1 | 1 | 0 | 2 |
|  | 10 | 0 | 0 | 0 | 1 | 1 |
|  | 11 | 0 | 1 | 0 | 0 | 1 |
| node ID of base station group | | none | 4 | 2 | 3 | |

TABLE 9

|  |  | candidate set II | | | | duplication |
|---|---|---|---|---|---|---|
|  |  | B | C | D | F | quantity |
| isolated node ID | 5 | 0 | 1 | 1 | 1 | 3 |
|  | 6 | 0 | 1 | 0 | 0 | 1 |
|  | 7 | 0 | 0 | 0 | 1 | 1 |
|  | 8 | 1 | 0 | 0 | 1 | 2 |
|  | 9 | 1 | 1 | 0 | 0 | 2 |
|  | 10 | 0 | 0 | 1 | 1 | 2 |
|  | 11 | 1 | 0 | 0 | 0 | 1 |
| node ID of base station group | | 4 | 2 | 3 | None | |

The duplication quantity calculation section 24 calculates the redundancy by calculating the sum of the elements in each row of Table 8 and Table 9. Then, the selection processing section 22 selects the relay node installation point candidate set in which the number of the isolated nodes with duplication quantity 2 or higher becomes numerous. The number of isolated nodes with duplication quantity higher than 2 in candidate set I is smaller than that in the candidate set II. Therefore, the selection processing section 22 selects the relay node installation point candidate in Table 9. In this selection, it may be possible to take into account the value itself of the duplication quantity. In other words, it may be possible to calculate the average duplication quantity of each set and to select the candidate set based on the result.

Embodiment 4

The following is the explanation of a relay node installation point selection method in embodiment 4 of the present invention.

This embodiment is for a relay node installation point selection method for selecting the relay node installation point candidate set in which the number of hops of the isolated node is lessened. According to this embodiment, since it is possible to reduce the number of hops of the isolated node as small as possible, the preferable effect in communication such as reduction in transfer time is obtained.

In this embodiment, the average number of hops, i.e. the average value of the number of hops of the relay node installation point candidates and the base station in the relay node installation point candidate set selected by the selection processing section 22 is calculated by the average hop-number calculation section 26 to select a proper relay node installation point candidate set from among the plural relay node installation point candidate sets based upon this. It is possible to reduce the number of hops of the isolated node by reducing the number of hops of the relay node installation point candidate. A concrete explanation is as follows.

For example, let's assume that Table 8 and Table 9 showing a one-hop-connection relationship between the isolated node and the relay node installation point candidate in the two relay node installation point candidate sets are obtained in the embodiment 1 or the embodiment 2 (as described above, Table 8 and Table 9 relate to the wireless multi-hop network different from that to which Table 1 to Table 7 relate).

The average hop-number calculation section 26 calculates the number of hops of each relay node installation point candidate in each relay node installation point candidate set. In Table 8 and Table 9, let's assume that the number of hops of the node 2 is 2, the number of hops of the node 3 is 2, and the number of hops of the node 4 is 3. Further, let's assume that the relay node installation point candidate A enables a connection to the base station via the isolated node 8 and the relay node B and the number of hops is 5. Furthermore, let's assume that the relay node installation point candidate F enables a connection to the base station via the isolated node 5 and the relay node D and the number of hops is 4. Then, the average number of hops is (5+3+2+2)/4=3 in Table 8 and (4+3+2+2)/4=2.75 in Table 9. Therefore, the selection processing section 22 selects the relay node installation point candidate set in Table 9.

OTHER EMBODIMENTS

The relay node installation point selection device 2 may work as one function of the base station. At this time, the base station has both the function of diagnosing the node-to-node connectability and the function of selecting the relay node installation point. In this case, insertion of the node-to-node connectability diagnosis between the selection processes of the relay node installation point may raise the possibility of further reducing the number of relay nodes. This is because there may be a case where a direct connection between the isolated nodes becomes possible.

Further, it may be possible to connect the relay node installation point selection device 2 (including the case of being included in the base station) and the wireless device having a function of detecting the node connectable in one hop arranged at the base station and/or the relay node installation point candidate via a wired network so that the input section 21 of the relay node installation point selection device 2 receives the node-to-node connectability diagnosis result and the detection result of the node connectable in one hop at the relay node installation point candidate via a wired network. In this case, it may be possible for the relay node installation point selection device 2 to carry out the node-to-node connectability diagnosis and the detection of the node connectable in one hop by controlling the base station and/or the wireless device.

Furthermore, when the isolated node group has one or plural identical broadcasting domains, it may be possible only to carry out the process in the embodiments described above for one isolated node for each identical broadcasting domain.

It may be possible to realize the relay node installation point selection device 2 of the present invention by storing a program for realizing the function thereof in a computer-readable recording medium, and causing a computer, which will serve as the relay node installation point selection device 2 of the present invention, to load the program stored in the recording medium for execution in addition to realizing the function using dedicated hardware. The so-called computer-readable recording media include recoding media such as a floppy disk, a magneto-optic disk, and a CD-ROM, and a storage device such as a hard disk device built in a computer system. Further, the so-called computer-readable recording media include one for dynamically holding a program for a brief time in such a case of transmitting a program over the Internet (transmission media or transmission waves) or one for holding a program for a predetermined period of time, for example, a volatile memory within a computer system.

While this invention has been described in connection with certain exemplary embodiments, it is to be understood that the subject matter encompassed by way of this invention is not be limited to those specific embodiments. On the contrary, it is intended for the subject matter of the invention to include all alternatives, modification and equivalents as can be included with the sprit and scope of the following claims. Further, the inventor's intent is to retain all equivalents even if the claims are amended during prosecution.

What is claimed is:

1. A method for selecting a relay node installation point where a relay node is to be installed for relaying data transfer and forming a route between a base station and an isolated node which is not connectable to the base station in a wireless multi-hop network from among predetermined relay node installation point candidates, comprising the steps of:
   a first step for identifying the isolated node and a connected node, which is connectable to said base station, by using a node-to-node connectability diagnosis result by said base station;
   a second step for identifying a node which is directly connectable to each relay node installation point candidate by using a detection result of a node to which a direct connection is enabled by each of the relay node installation point candidates; and
   a third step for selecting a relay node installation point candidate, where the relay node is directly connectable to both of the connected node and an isolated node, as the relay node installation point.

2. The method according to claim 1, said method further comprising:
   a fourth step, when there still remains the isolated node unconnectable to said base station, selecting the relay node installation point candidate, where the relay node is directly connectable to both of a connected isolated node, which has become connectable to said base station by the relay node to be installed at the relay node installation point having been selected, and the remaining isolated node as the relay node installation point.

3. The method according to claim 2, said method further comprising:
   a fifth step for, when there are plural sets of relay node installation points obtained in said fourth step, calculating an average number of hops, which is an average of the number of hops between a relay node installation point and said base station for each set of relay node installation points; and
   a sixth step for selecting one set from among the plural sets of relay node installation points based on said average number of hops.

4. The method according to claim 2, said method further comprising:
   a fifth step for, when there are plural sets of relay node installation points obtained in said fourth step, with respect to a connected isolated node which has become connectable to said base station by the relay node to be installed at the relay node installation point having been selected, calculating a duplication quantity indicating the number of relay node installation points, to which the connected isolated node is directly connectable, for each set of relay node installation points; and
   a sixth step for selecting one set from among the plural sets of relay node installation points based on the number of connected isolated nodes having said duplication quantity more than a predetermined number.

5. The method according to claim 1, said method further comprising:
   a fourth step for, when there are plural sets of relay node installation points obtained in said third step, calculating an average number of hops, which is an average of the number of hops between a relay node installation point and said base station for each set of relay node installation points; and
   a fifth step for selecting one set from among the plural sets of relay node installation points based on said average number of hops.

6. A method for selecting a relay node installation point where a relay node is to be installed for relaying data transfer and forming a route between a base station and a isolated node which is not connectable to the base station in a wireless multi-hop network from among predetermined relay node installation point candidates, comprising the steps of:
   a first step for identifying the isolated node and a connected node, which is connectable to said base station, by using a node-to-node connectability diagnosis result by said base station;
   a second step for identifying a node which is directly connectable to each relay node installation point candidate by using a detection result of a node to which a direct connection is enabled by each of the relay node installation point candidates;
   a third step for classifying the relay node installation point candidates into two groups of group A and group B, wherein the group A includes the relay node installation point candidate which is connectable to the base station and the group B includes the relay node installation point candidate which is not connectable to the base station;
   a fourth step for, with respect to each isolated node, calculating a duplication quantity indicating the number of relay node installation point candidates belonging to the group A to which the isolated node is directly connectable;
   a fifth step for selecting the relay node installation point candidate in the group A, which is directly connectable to the isolated node having the smallest duplication quantity, as the relay node installation point; and
   a sixth step for, when there still remains the isolated node unconnectable to said base station, selecting the relay node installation point candidate in the group A, which is directly connectable to the isolated node having the next smallest duplication quantity and also a number of isolated nodes to be directly connectable is the most, as the relay node installation point.

7. The method according to claim 1; said method further comprising:
   a fourth step for, when there are plural sets of relay node installation points obtained in said third step, with respect to a connected isolated node which has become connectable to said base station by the relay node to be installed at the relay node installation point having been selected, calculating a duplication quantity indicating the number of relay node installation points, to which the connected isolated node is directly connectable, for each set of relay node installation points; and a fifth step for selecting one set from among the plural sets of relay node installation points based on the number of connected isolated nodes having a predetermined number of said duplication quantity.

8. The method according to claim 6, said method further comprising:

a seventh step, with respect to each isolated node, calculating the duplication quantity indicating the number of relay node installation point candidates belonging to the group B to which the isolated node is directly connectable;

an eighth step for selecting the relay node installation point candidate in the group B, which is directly connectable to an unconnected isolated node having the smallest duplication quantity and also a number of already connected isolated nodes to be directly connectable is the most, as the relay node installation point, wherein the unconnected isolated node is an isolated node which is still unconnectable to the base station even by the relay node to be installed at the relay node installation point having been selected, and the already connected isolated node is an isolated node which has become connectable to the base station by the relay node to be installed at the relay node installation point having been selected.

9. The method according to claim 8, said method further comprising a ninth step for, when there still remains the unconnected isolated node, selecting the relay node installation point candidate in the group B, which is directly connectable to the unconnected isolated node having the next smallest duplication quantity and also the number of already connected isolated nodes to be directly connectable is the most, as the relay node installation point.

10. The method according to claim 8, said method further comprising:

a ninth step for, when there are plural sets of relay node installation points obtained in said eighth step, with respect to a connected isolated node which has become connectable to said base station by the relay node to be installed at the relay node installation point having been selected, calculating a duplication quantity indicating the number of relay node installation points, to which the connected isolated node is directly connectable, for each set of relay node installation points; and a tenth step for selecting one set from among the plural sets of relay node installation points based on the number of connected isolated nodes having said duplication quantity more than a predetermined number.

11. The method according to claim 8, said method further comprising:

a ninth step for, when there are plural sets of relay node installation points obtained in said eighth step, calculating an average number of hops, which is an average of the number of hops between a relay node installation point and said base station for each set of relay node installation points; and a tenth step for selecting one set from among the plural sets of relay node installation points based on said average number of hops.

12. A relay node installation point selection device for selecting a relay node installation point where a relay node is to be installed for relaying data transfer and forming a route between a base station and an isolated node which is not connectable to the base station in a wireless multi-hop network from among predetermined relay node installation point candidates, said device comprising:

an input section which receives a node-to-node connectability diagnosis result by said base station for identifying the isolated node and a connected node, which is connectable to said base station, and a detection result of a directly connectable node at each of said relay node installation point candidates for identifying a node which is directly connectable to each relay node installation point candidate; and a selection processing section which selects the relay node installation point candidate, where the relay node is directly connectable to both of the connected node and the isolated node, as the relay node installation point as a first process.

13. The device according to claim 12, wherein said selection processing section selects, when there still remains the isolated node unconnectable to said base station, the relay node installation point candidate, where the relay node is directly connectable to both of a connected isolated node, which has become connectable to said base station by the relay node to be installed at the relay node installation point having been selected, and the remaining isolated node as the relay node installation point, as a second process.

14. The device according to claim 13, said device further comprising:

a duplication quantity calculation section which calculates, for each connected isolated node which has become connectable to said base station, a duplication quantity indicating the number of relay node installation points to which the connected isolated node is directly connectable; and wherein said selection processing section selects, when there are plural sets of relay node installation points obtained in said second process, one set from said plural sets of relay node installation points based on the number of connected isolated nodes having a predetermined number of said duplication quantity.

15. The device according to claim 13, said device further comprising an average number of hops calculation section which calculates, for each of plural sets of relay node installation points, an average number of hops being an average of the number of hops between each relay node installation point included therein and said base station, wherein said selection processing section selects, when there are plural sets of relay node installation points obtained in said second process by said selection processing section, one set from said plural sets of relay node installation points based on said average number of hops.

16. The device according to claim 12, said device further comprising:

a duplication quantity calculation section which calculates , for each connected isolated node which has become connectable to said base station, a duplication quantity indicating the number of relay node installation points to which the connected isolated node is directly connectable; and wherein said selection processing section selects, when there are plural sets of relay node installation points obtained in said first process, one set from said plural sets of relay node installation points based on the number of connected isolated nodes having a predetermined number of said duplication quantity.

17. The device according to claim 12, said device further comprising an average hop-number calculation section which calculates, for each of plural sets of relay node installation points, an average number of hops, which is an average of the number of hops between each relay node installation point included therein and said base station, where said selection processing section selects, when there are plural sets of relay node installation points obtained in said first process by said selection processing section, one set from said plural sets of relay node installation points based on said average number of hops.

18. A base station in a wireless multi-hop network having said base station and plural nodes for collecting data to be transmitted to the base station, said base station comprising:
   a node-to-node connectability diagnosis section for detecting a connected node which is connectable to the base station and an isolated node which is not connectable to the base station among said plural nodes outputs a node-to-node connectability diagnosis result;
   an input section which receives the node-to-node connectability diagnosis result for identifying the isolated node and the connected node, and receives a detection result of a directly connectable node performed at each of relay node installation point candidates for identifying a node which is directly connectable to each relay node installation point candidate, where a relay node is to be installed for relaying data transfer for the isolated node; and
   a selection processing section which selects the relay node installation point candidate connectable to both of the connected node and the isolated node, as the relay node installation point as a first process.

19. The base station according to claim 18, wherein said selection processing section selects, when there still remains the isolated node unconnectable to said base station, the relay node installation point candidate, where the relay node is directly connectable to both of a connected isolated node, which has become connectable to said base station by the relay node to be installed at the relay node installation point having been selected, and the remaining isolated node as the relay node installation point as a second process.

20. A relay node installation point selection device for selecting a relay node installation point where a relay node is to be installed for relaying data transfer and forming a route between a base station and an isolated node which is not connectable to the base station in a wireless multi-hop network from among predetermined relay node installation point candidates, said device comprising:
   an input section which receives a node-to-node connectability diagnosis result by said base station for identifying the isolated node and a connected node, which is connectable to said base station, and a detection result of a directly connectable node at each of said relay node installation point candidates for identifying a node which is directly connectable to each relay node installation point candidate;
   a duplication quantity calculation section which calculates, for each isolated node, a duplication quantity indicating the number of relay node installation point candidates to which the isolated node is directly connectable; and
   a selection processing section which, as a first processing, classifies the relay node installation point candidates into two groups of group A and group B, wherein the group A includes the relay node installation point candidate which is connectable to the base station and the group B includes the relay node installation point candidate which is not connectable to the base station; as a second processing, selects the relay node installation point candidate in the group A, which is directly connectable to the isolated node having the smallest duplication quantity, as the relay node installation point; and as a third processing, when there still remains the isolated node unconnectable to said base station, selects the relay node installation point candidate in the group A, which is directly connectable to the isolated node having the next smallest duplication quantity and also a number of isolated nodes to be directly connectable is the most, as the relay node installation point.

21. The device according to claim 20, wherein said selection processing section selects, as a fourth processing, the relay node installation point candidate in the group B, which is directly connectable to an unconnected isolated node having the smallest duplication quantity and also a number of already connected isolated nodes to be directly connectable is the most, as the relay node installation point, wherein the unconnected isolated node is an isolated node which is still unconnectable to the base station even by the relay node to be installed at the relay node installation point having been selected, and the already connected isolated node is an isolated node which has become connectable to the base station by the relay node to be installed at the relay node installation point having been selected.

* * * * *